C. F. BOSWORTH.
Sewing Machine.

No. 19,979.  Patented April 20, 1858.

UNITED STATES PATENT OFFICE.

C. F. BOSWORTH, OF PETERSHAM, MASSACHUSETTS.

IMPROVEMENT IN SEWING-MACHINES.

Specification forming part of Letters Patent No. 19,979, dated April 20, 1858.

*To all whom it may concern:*

Be it known that I, CHAS. FRED. BOSWORTH, of Petersham, in the county of Worcester and State of Massachusetts, have invented certain new and useful Improvements in Sewing-Machines; and I do hereby declare that the following is a full, clear, and exact description of the same, reference being had to the accompanying drawings, making part of this specification, in which the figures are fully explained, and similar letters indicate similar parts throughout.

My improvement consists in the device for producing and regulating the feed of the cloth.

In the machine represented in the accompanying drawings the looper-shaft $a$ is caused to vibrate by means of a crank, $b$, attached to its rear end, the crank-pin working in the groove of a revolving cam.

To the front end of the looper-shaft $a$, and immediately in the rear of the looper $c$, is fastened a lever, $d$, to the upper end of which the upright feeding-arm $g$ is jointed in such a manner as to allow of its vibrating motion upon said joint as center. The feeding-arm terminates on its upper end in a chisel-edge, $f$, or in a roughened surface extending in a line at right angles to the line or direction of the feed, and works in and through a slot in the sewing-table or plate $k$, which is wide enough to allow of the maxima vibration of the feeder.

Figure 1:
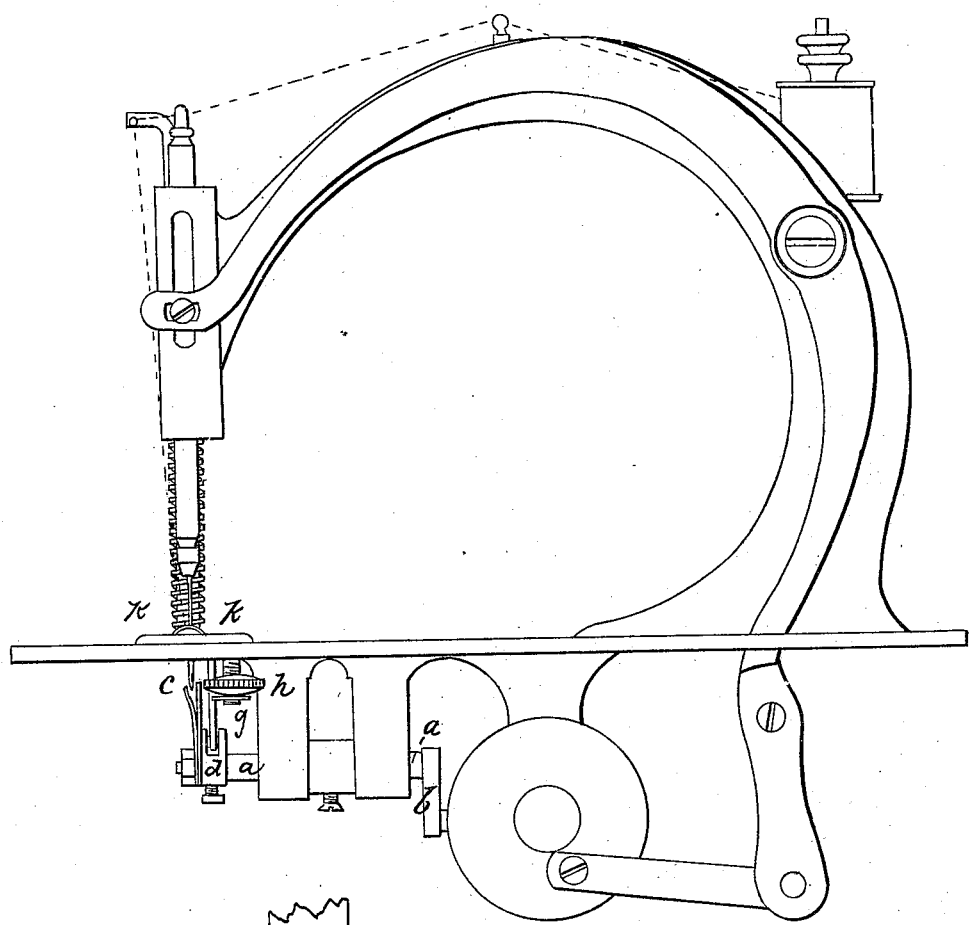
Figures 2, 3:
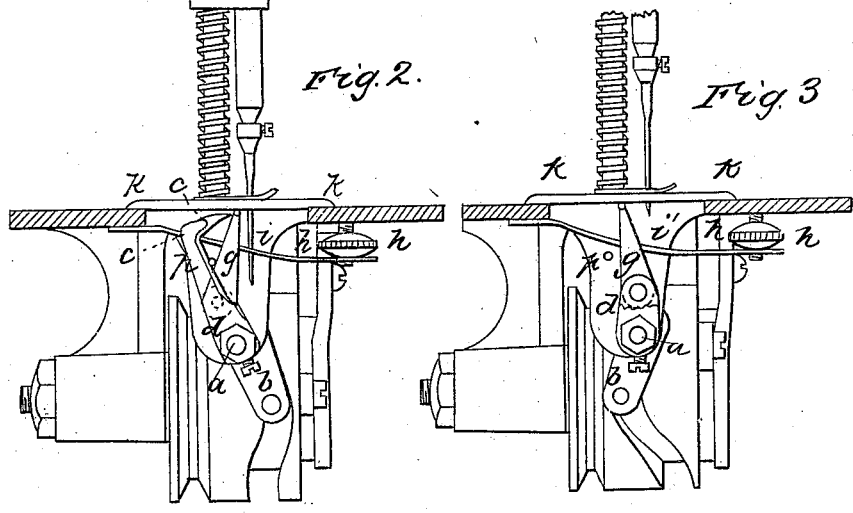

Figures 2 and 3 represent the feeder in its extreme positions—*i. e.*, at the beginning and at the end of a feed.

During part of the vibration of the lever or rocker $d$ the feed-hand $g$ is caused to project slightly above the surface of the sewing-table, when it will exert a gentle pressure against and slightly lift the yielding pressure-pad, the slot through which the feeder passes being arranged immediately underneath the pressure-pad, and the cloth to be sewed is introduced between the pressure-pad and the table, so as to cover the slot, as in other sewing-machines, where the feed passes through the table, and is alternately worked upon by the feeder for the purpose of being shoved along the proper distance after each stitch, as described hereafter.

From the above description and an inspection of the drawings it will be understood that the joint connecting the upper end of the rocker $d$ with the lower end of the feed-hand vibrates so as to describe an arc of a circle of which the looper-shaft forms the center. The motion of the feeding-arm is laterally limited by a stationary pin or stud, $p$, and the edge $i$ of a guard-plate, which latter can be raised or lowered by means of a set-screw, $h$, so as to give the feeding-arm more or less range of lateral motion, and thereby increase or diminish the feed of the cloth. When the crank $b$ has arrived at the end of its vibration, the feeding-arm just touches the pin $p$, and the opposite side of the chisel-edge rests against the side of the slot, somewhat below the upper surface of the sewing-table. As soon as the crank commences its sweep toward the other side the feed-hand is caused to assume a vertical position, and the chisel-edge consequently rises slightly above the surface of the sewing-table, its side remaining in contact with the side of the slot. The chisel-edge, as it rises, presses the cloth and the elastic pressure-pad slightly upward. When the rocker $d$ and the feed-hand $g$ are about in a vertical line, and consequently the chisel-edge at its highest elevation above the table, the side of the feed-hand comes to abut against the edge $i$ of the guard-plate, and the chisel-edge begins to move toward the other side of the slot, the edge $i$ serving as a fulcrum for the feed-hand. The chisel-edge, as it moves from one side of the slot toward the other, shoves the cloth along underneath the pressure-pad, thereby effecting the proper feed. When the crank begins to sweep backward, the lower portion of the feeding-arm moves, of course, with it, until the side of the feed-hand comes into contact with the pin $p$. Now this pin acts as fulcrum for the feed-hand, and the chisel-edge suddenly descends below the surface of the table and moves across the slot into the position first described, when one side of the feed-hand was in contact with the pin $p$ and the opposite side of the chisel-edge in contact with the side of the slot. The operation, as above described, will then be repeated.

Having now fully described my improvements, what I claim as my invention, and desire to secure by Letters Patent, is—

1. The jointed rocking feed-hand constructed and arranged, as described, so as to play freely between and upon two fulcra when operating from beneath the sewing-table, in combination with the pressure-pad above said table, in the manner and for the purpose specified.

2. Regulating the angle of vibration of the feed-hand, constructed, arranged, and operating, as herein described, by means of two stops, one of which is so adjustable as to allow the fulcrum upon which the said feed-hand moves to be raised or lowered, thereby diminishing or increasing the feed at pleasure, substantially as set forth.

In testimony whereof I have signed my name to this specification before two subscribing witnesses.

CHAS. FRED. BOSWORTH.

Witnesses:
  A. POLLAK,
  JOHN S. HOLLINGSHEAD.